P. HALE.
TIDE MOTOR.
APPLICATION FILED AUG. 5, 1912.

1,055,033.

Patented Mar. 4, 1913.

2 SHEETS—SHEET 1.

WITNESSES
C. E. Wessels
Thomas Colson

INVENTOR
Perley Hale,
BY Joshua R. H.
ATTORNEY

P. HALE.
TIDE MOTOR.
APPLICATION FILED AUG. 5, 1912.
1,055,033.
Patented Mar. 4, 1913.
2 SHEETS—SHEET 2.
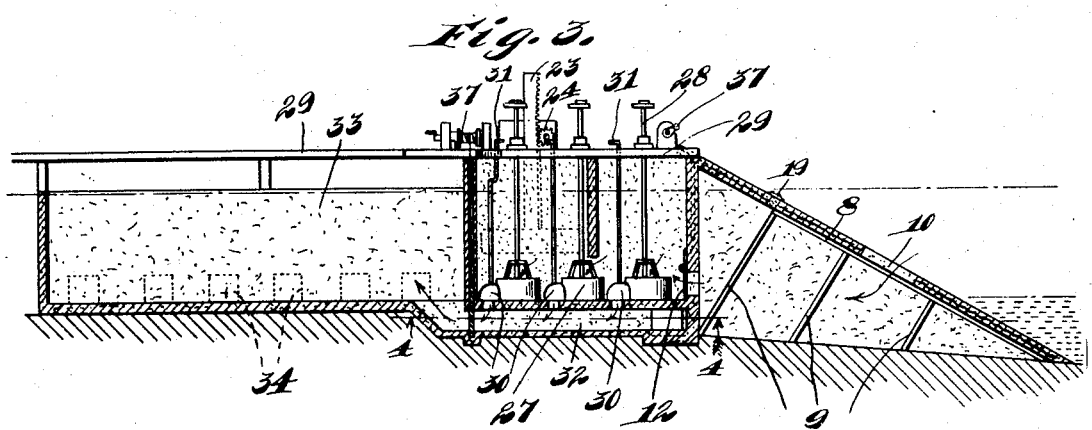
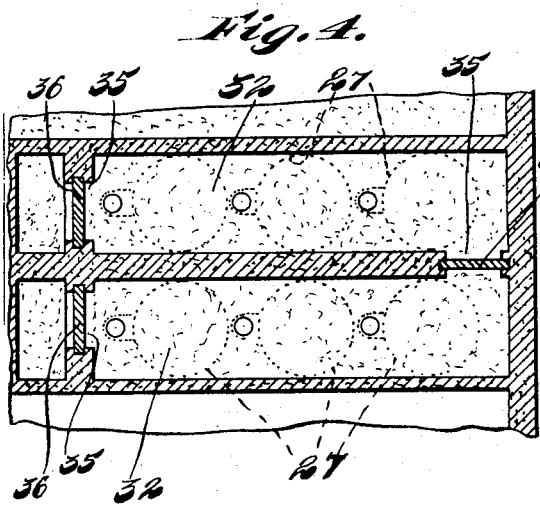
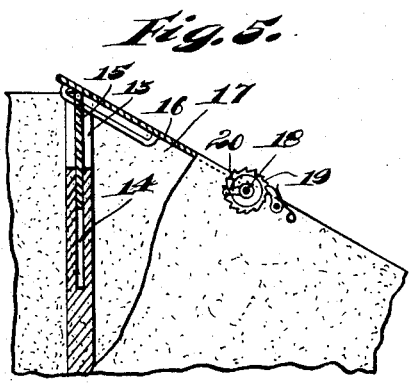
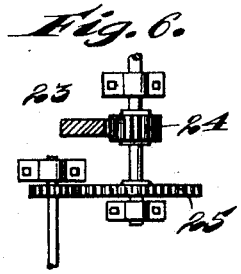
WITNESSES
C. E. Wessels.
Thomas Colson.
INVENTOR
Perley Hale,
BY Joshua R. H. Horn
ATTORNEY

UNITED STATES PATENT OFFICE.

PERLEY HALE, OF CHICAGO, ILLINOIS.

TIDE-MOTOR.

1,055,033.  Specification of Letters Patent.  Patented Mar. 4, 1913.

Application filed August 5, 1912. Serial No. 713,426.

*To all whom it may concern:*

Be it known that I, PERLEY HALE, a citizen of the United States, and a resident of the city of Chicago, county of Cook, and State of Illinois, have invented certain new and useful Improvements in Tide-Motors, of which the following is a specification.

My invention relates to tide motors and particularly to the class of such motors which is acted upon both by the waves and the tide.

The object of this improvement is to provide a device of the character mentioned, which will be simple in construction and efficient in operation.

Other objects will appear hereinafter.

The invention consists in the combinations and arrangements of parts hereinafter fully described and claimed.

Figure 1:
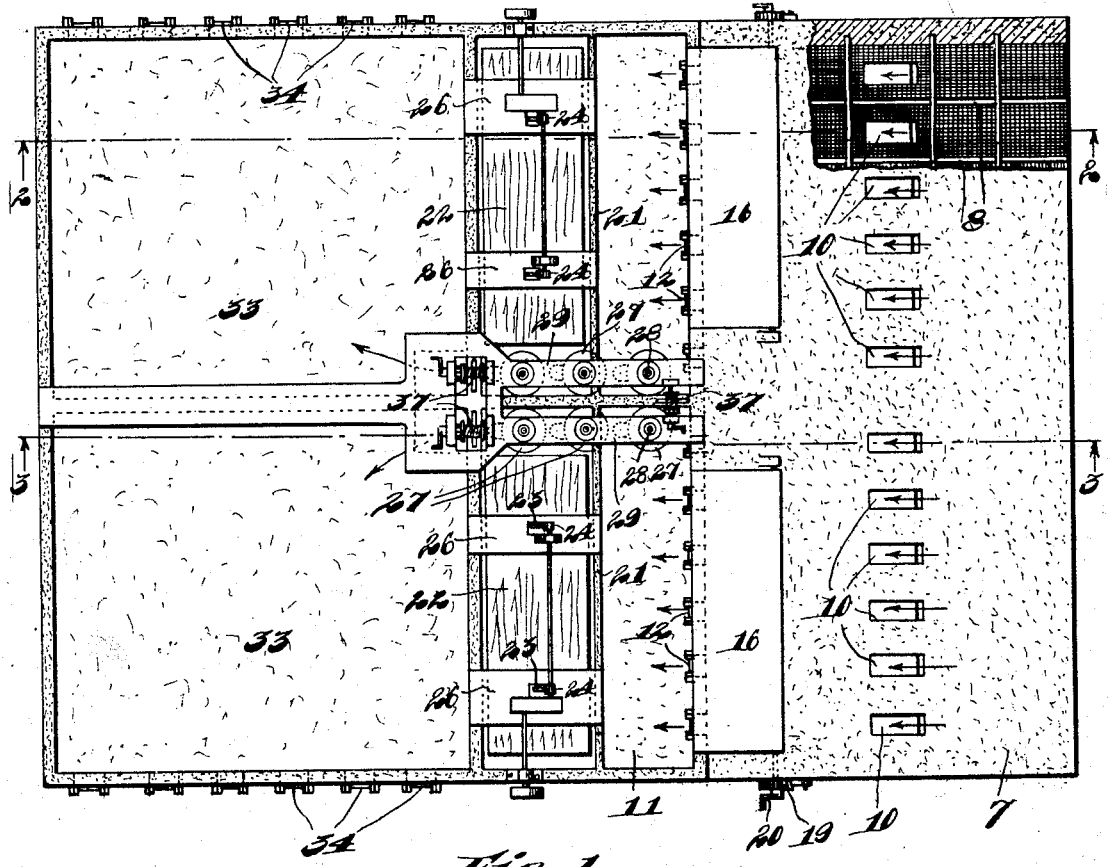
Figure 2:
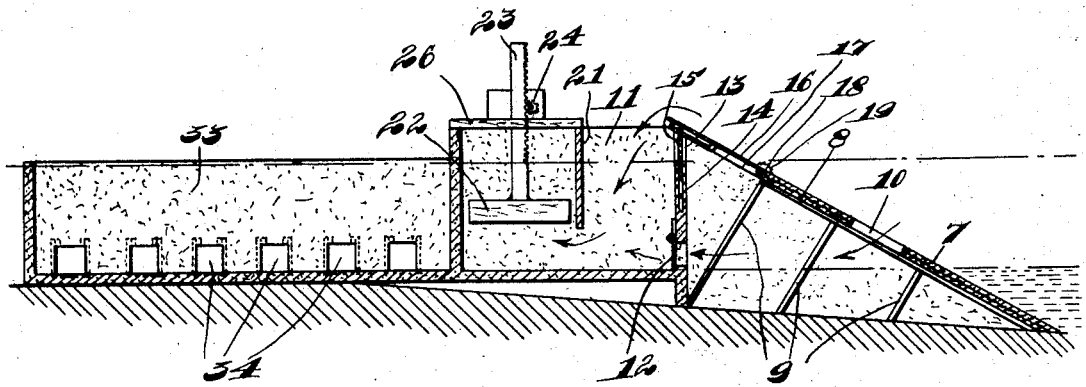

The invention will be best understood by reference to the accompanying drawings, and in which, Figure 1 is a plan view with a corner portion removed to show the reinforced construction of a tide motor built in accordance with my invention, Fig. 2 is a vertical section of the same taken on line 2—2 in Fig. 1, Fig. 3 is a similar view taken on line 3—3 in Fig. 1, Fig. 4 is a horizontal section taken on line 4—4 in Fig. 3, Fig. 5 is a part vertical section and part side elevation of a fragment showing the connection between the front of the motor basin and top of the inclined wall, and Fig. 6 is a plan view of the clock gears used for taking the power from the pinion-and-rack of the float.

The preferred form of construction, as illustrated in the accompanying drawings, comprises a motor basin in which is mounted a vertically moving float and water turbines, a waste basin in communication with said motor basin and an inclined wall on the seaward side of the motor basin and provided with communications for the passage of water through the device. It is preferred to make at least two motor basins and two wash basins, inclined walls, and waste basins, as shown in the drawings.

The walls of the entire device are preferably composed of reinforced concrete and the inclined wall 7 is provided with supporting ribs 8 and posts 9 to give it strength. The wall 7 is provided with openings 10 through which the water enters from the rising tide. The motor basin 11 is provided with intake valves 12 through which water enters from the chamber covered by the inclined wall 7 and such intake valves 12 are made in such a manner as to permit of water entering, but will not allow its flowing out of the motor chamber 11.

The front or seaward wall of the motor chamber 11 is provided with a recess 13 and such recess is provided with a peripheral groove 14 into which is mounted a gate 15 for vertical sliding. A door 16, preferably of metallic construction, is hinged to the lower side of recess 17 in the inclined wall 7, as at 18, to permit of vertical swinging of such door. Said door 16 is connected with the gate 15 by means of a slot-and-pin connection to raise and lower the gate 15 upon swinging the door 16. A ratchet-and-pawl 19 is provided on the pintle of the hinge 18 of the door 16 to maintain the door 16 in desired positions. A crank 20 is provided on the end of the pintle of the hinge 18 by which the door 16 is manually swung on its hinges.

A baffle plate 21 is formed in the motor basin 11 in the upper portion thereof and extends longitudinally with the seaward side of said motor basin to prevent splashing of water on the float 22 which is mounted in the motor basin for vertical movement therein. The float 22 is provided with a rack 23 which engages a pinion 24 on a clock movement 25, which furnishes a means for taking power from the vertical movement of the float 22. A suitable bridge 26 is provided over the motor basin 11 to support the float guiding racks 23 and the clockwork mechanism 25.

Near one end of the motor basin 11 is provided a number of turbines 27 which are in communication with the chamber in the motor basin 11 and provided with their working shafts 28 extended through and supported by the bridge 29 to permit of taking power from such water turbines. A controlling valve 30, of conventional design, is provided in each of the water turbines to control such turbine. Each of the valves 30 is provided with a controlling handle 31 extended through and supported by the bridge 29 for manual operation of such valve 30. A waste water passage 32 is furnished under the motor basin 11 which permits the waste water after passing through the turbines to pass away from the motor chamber 11 and into the waste basin 33. Such waste basin 33 is provided with outlet doors 34 which permit of the waste water leaving the waste basin as the tide recedes. When two or more of the devices are built together as illustrated in the drawings, the waste water passages 32 are provided with communications 35, as clearly illustrated in Figs. 3 and 4, and provided with gates 36 so that the waste water may be emptied in the desired basin. Windlasses 37 or other manually operative means are provided to operate the gates 36 in the communications 35 to control such communications.

In operation, the tide rising, enters the openings 10, passes through the chamber between the inclined wall 7 and the seaward wall of the motor basin 11, passes through the intake valves 12 and upon rising in the motor basin 11, raises the float 22, thereby imparting motion to it and such motion is communicated to the clock gears as already described. Upon opening of the valves 30 the water turbines 27 will be operated by the water passing from the motor basin into the waste passages 32 and power may be taken from such water turbines through their shafts 28. The water then passes from the waste passages 32 into the waste chamber 33 and remains in such waste basin until the tide begins to recede, when it passes out through the outlet valves 34.

The doors 16 are designed to be raised and lowered to control the passage of waves therein into the motor basin 11. It is intended to raise the doors 16 proportionately with the height at which the waves are running to prevent excessive agitation in the motor basin 11.

While I have illustrated and described the preferred form of construction for carrying my invention into effect, this is capable of variation and modification without departing from the spirit of the invention. I, therefore, do not wish to be limited to the precise details as set forth, but desire to avail myself of such variations and modifications as come within the scope of the appended claims.

Having described my invention, what I claim as new and desire to secure by Letters Patent, is:

1. A tide motor comprising a motor basin; a waste basin in communication with said motor basin; an inclined wall having its upper edge joining the top edge of one of the sides of said motor basin forming a substantially water-tight joint therebetween, means for raising and lowering the upper edge of said inclined wall, and motors in said motor basin, substantially as described.

2. A tide motor comprising a motor basin; a waste basin in communication with said motor basin; an inclined wall having its upper edge joining the top edge of one of the sides of said motor basin and forming a substantially water-tight joint there between, and provided with perforations in its intermediate portion; inlet valves in said motor basin; outlet valves in said waste basin; motors in said basin; and means for raising and lowering the upper edge of said inclined wall and its engaging edge of the wall of said motor basin, substantially as described.

3. A tide motor comprising a motor basin; a waste basin in communication with said motor basin; an inclined wall having its upper edge joining the top edge of one of the sides of said motor basin and forming a substantially water-tight joint there between, and provided with perforations in its intermediate portion; inlet valves in said motor basin; outlet valves in said waste basin; motors in said basin; means for raising and lowering the upper edge of said inclined wall and its engaging edge of the wall of said motor basin; and means for maintaining the upper edge of said inclined wall and the top of its engaging wall at different heights, substantially as described.

4. In combination, a motor basin having a recess in the top of one of its sides and a peripheral groove in the edge of said recess; a gate mounted to slide vertically in said groove; a wall inclined toward the recessed wall of said motor basin and provided with a recess in its upper portion; and a door hinged to said wall in said recess with its free edge connected with said gate, substantially as described.

5. In combination, a motor basin having a recess in the top of one of its sides and a peripheral groove in the edge of said recess; a gate mounted to slide vertically in said groove; a wall inclined toward the recessed wall of said motor basin and provided with a recess in its upper portion; a door hinged to said wall in said recess with its free edge connected with said gate; and means for moving said door on its hinges, substantially as described.

6. In combination, a motor basin having a recess in the top of one of its sides and a peripheral groove in the edge of said recess; a gate mounted to slide vertically in said groove; a wall inclined toward the recessed wall of said motor basin and provided with a recess in its upper portion; a door hinged to said wall in said recess with its free edge connected with said gate; means for moving said door on its hinges; and a baffle plate in said motor basin, substantially as described.

7. In combination, a motor basin having a recess in the top of one of its sides and a peripheral groove in the edge of such recess; a vertically sliding gate mounted in said groove; a wall inclined toward the recessed wall of said motor basin and provided with a recess in its upper portion; a door hinged to said wall in said recess with its free edge connected with said gate; intake doors in said motor basin; a waste basin in communication with said motor basin; outlet valves in said waste basin; and motors in said communication between said motor basin and said waste basin, substantially as described.

8. A plurality of motor basins; a plurality of waste basins; motors in said motor basins; waste water passages connecting said motors with said waste basins; and gates in said waste water passages adapted to permit the passage of water from said water motors to either one or both of said motor basins, substantially as described.

In testimony whereof I have signed my name to this specification in the presence of two subscribing witnesses.

PERLEY HALE.

Witnesses:
JOSHUA R. H. POTTS,
B. G. RICHARDS.